(12) United States Patent
Lie

(10) Patent No.: US 7,380,513 B2
(45) Date of Patent: Jun. 3, 2008

(54) FAIRING FOR REDUCING WATERCURRENT-INDUCED STRESSES ON A MARINE RISER

(75) Inventor: Halvor Lie, Trondheim (NO)

(73) Assignee: Sinvent AS, Trondheim (NO)

( * ) Notice: Subject to any disclaimer, the term of this patent is extended or adjusted under 35 U.S.C. 154(b) by 0 days.

(21) Appl. No.: 11/418,192

(22) Filed: May 5, 2006

(65) Prior Publication Data

US 2007/0215028 A1    Sep. 20, 2007

(30) Foreign Application Priority Data

Mar. 15, 2006    (NO) .................................. 20061217

(51) Int. Cl.
*B63B 21/66* (2006.01)
*E02D 5/60* (2006.01)

(52) U.S. Cl. ...................................... 114/244; 405/211

(58) Field of Classification Search ................. 114/243
See application file for complete search history.

(56) References Cited

U.S. PATENT DOCUMENTS

| | | | |
|---|---|---|---|
| 4,398,487 A | 8/1983 | Ortloff et al. | |
| 4,474,129 A | 10/1984 | Watkins et al. | |
| 4,657,116 A | 4/1987 | Gardner et al. | |
| 5,410,979 A | 5/1995 | Allen et al. | |
| 6,067,922 A | 5/2000 | Denison et al. | |
| 6,179,524 B1 | 1/2001 | Allen et al. | |
| 6,189,475 B1 | 2/2001 | Coakley | |
| 6,196,768 B1 | 3/2001 | Allen et al. | |
| 6,223,672 B1 | 5/2001 | Allen et al. | |
| 6,401,646 B1 | 6/2002 | Masters et al. | |
| 6,415,730 B1 | 7/2002 | Barker | |
| 6,551,029 B2 | 4/2003 | Shu et al. | |

FOREIGN PATENT DOCUMENTS

WO    2005019595 A1    3/2005

OTHER PUBLICATIONS

Slocum, S.T., et al., Flutter Instability in Riser Fairings, Offshore Technology Conference, OTC 16342, copyright 2004, 13 pages.
Norwegian Search Report for related Norwegian Patent Application No. 20061217, 1 page (Jul. 25, 2006).

*Primary Examiner*—Jesús D Sotelo
(74) *Attorney, Agent, or Firm*—Rothwell, Figg, Ernst & Manbeck, PC

(57) ABSTRACT

The invention relates to a rotatable fairing (1) for a marine riser (2) or other slender marine structure. The fairing (1) is arranged on the riser for reducing watercurrent-induced stresses on said riser (2), said fairing (1) having a tail portion (3) for trailing generally in the downstream direction behind said riser. The fairing (1) is provided with an attenuation unit (8) for counteracting the unstable rotation of said fairing (2) relative to said riser (2), in order to prevent undesired vibrations of said riser (2). The fairing is provided with one or more clamps (10) for attachment to and around a periphery of said riser (2), said clamps (10) arranged with a gear rim (12) for engagement with an actuating cogged wheel (14) of said attenuation unit (8).

26 Claims, 3 Drawing Sheets

FAIRING FOR REDUCING WATERCURRENT-INDUCED STRESSES ON A MARINE RISER

The present invention relates to a rotatable fairing for a marine riser, said fairing for the reduction of water-induced loads and stresses on said riser. Marine risers and other slender structures standing in a body of water may be subject to undesirable so-called vortex-induced vibrations. Such vibrations may eventually incur fatigue damage of the structure.

Vortex-induced vibrations are related to vortices formed due to water-currents being split by the pipe and rejoined downstream behind the pipe, please see FIG. 2. The downstream shedding of the vortices may incur a figure-eight motion of the pipe in directions perpendicular to the pipe axis and with a main movement in the direction perpendicular to the water-current direction. Such vortex-induced vibrations comprise in-line oscillations and cross-flow oscillations. Vortex-induced vibrations may incur bending stresses and axial stresses on the riser. Vortex-induced vibrations are suspected of having incurred fatigue damage to deep-drilling risers in recent years.

Vortex-induced vibrations may generally be a problem for drilling risers, production risers, mooring lines, tension legs, spar hulls, and platform columns for generally vertically oriented structures, and also for generally horizontally arranged pipelines spanning over depressions in the seafloor.

Typically a riser having a diameter of 0.30 m subjected to a current velocity of 1.5 m/s may have an oscillation frequency $f_v=1$ s, and a cross-flow amplitude of about one riser diameter.

A vertical riser extending between a floating platform and the seafloor, the riser having a height of e.g. 2000 m and subject to a water-current velocity profile may act like a string vibrating in several harmonic modes, up to approximately the 50'th mode when the water-current velocity is high. The horizontal water-current velocity profile will usually have a vertical gradient with the highest current velocities near the sea surface. The riser may thus be subject to a velocity gradient that may induce an increasing number of competing modes when the velocity gradient increase and the vibration response will be difficult to predict.

BACKGROUND ART

Two different approaches have traditionally been used for preventing undesirable vortex-induced vibrations. A first approach uses so-called strakes, i.e. helically arranged continuous low-profile fins arranged along the pipe being subjected to the water current. Strakes are made with different helical pitch and with single, double-start or triple-start helices about the pipe. A pipe provided with strakes may have a significantly reduced cross-flow displacement compared to the naked pipe in the water current. However a considerable disadvantage of strakes is that they significantly increase drag and may thus increase the vertical and horizontal load on the riser system, the mooring system and the platform.

Another approach for preventing vortex-induced vibrations comprises several types of so-called fairings, i.e. teardrop-profiled wings arranged more or less concentrically about the pipe in order to reduce the drag force and to partially prevent vortex-induced vibrations.

Passively rotatable fairings are used for reducing drag and counteracting vortex-induced vibrations on a riser. A considerable disadvantage related to the use of traditional fairings is that, in order to effectively prevent vortex-induced vibrations, the chord length-to-diameter ratio must be high, and thus the drag increases. Further, if such long-tail fairings are arranged, the weight load on the riser and thus on the suspending platform may increase prohibitively. Long-tail fairings may also be expensive to install and to maintain.

Additionally, passively rotatable fairings have been shown to be unstable under certain circumstances, such as high relative water speed combined with relatively short chord length-to-diameter ratios of the fairing. The instability in mention resembles so-called "galloping" or "fluttering", terms used in civil and marine engineering and aerospace literature. The purpose of the present invention is to prevent such fairing instability.

An Offshore Technology Conference paper, OTC 16342 "Flutter instability in Riser Fairings", S. T. Slocum et al, 2004, describes experiments involving riser fairing models designed to rotate freely about a pipe axis and to passively align with the direction of incident flow so as for streamlining the flow regardless of current direction. It is observed that the rotational degree of freedom incurs the disadvantageous effect of coupling between cross-flow translation and rotation of the fairing and the pipe.

Several fairings are known from published patents and patent applications.

U.S. Pat. No. 5,410,979 describes relatively small fixed teardrop fairings for vortex induced vibration suppression. The fairings are described as non-rotatable. Accelerometers are mentioned in col. 3, line 39-47 for measuring accelerations of a model of a riser model provided with fairings. The measurements are given as a RMS acceleration for varying angles of attack of the water current relative to the fairing's fixed direction. U.S. Pat. No. 5,410,979 further mentions U.S. Pat. No. 4,398,487 and U.S. Pat. No. 4,474,129 describing passively rotatable fairings.

U.S. Pat. No. 4,474,129 defines a fairing constructed of synthetic foam and formed in two symmetrical parts that may be removably secured to riser buoyancy modules. The fairing has a neutral buoyancy in water.

U.S. Pat. No. 4,398,487 defines a rotatable fairing with bearings arranged for being connected to a vertical cylindrical element such as a flotation module on a marine drilling riser. The fairing comprises a heading or nose portion having a vertically arranged central bore for the generally cylindrical buoyancy element of the riser. The semicylindrical surface of the heading portion forms an even transition symmetrically on either side of the riser's axis to a tail portion arranged for turning passively with the water current flow. Tail fins are arranged at the trailing end of the tail portion and helps the fairing align with the current flow.

U.S. Pat. No. 6,067,922 describes a fairing manufactured from a simple plate that is bent around the riser pipe and of which the tail-forming plates are joined using attachment bolts and arranged for weathervaning to orient effectively with the water current.

U.S. Pat. No. 6,179,524 describes fixed fairings arranged with different orientations about a current direction expected to be a prevailing current direction.

U.S. Pat. No. 6,196,768 describes a rotatable fairing for an entire hull of a spar buoy platform. The fairing is provided with neutral buoyancy. Col. 4, lines 7-15 describes that the fairing may be rotated by using mooring lines.

U.S. Pat. No. 6,223,672 mentions fixedly mounted fairings and mentions the same U.S. Pat. No. 4,398,487 and U.S. Pat. No. 4,474,129 as mentioned above, in which is claimed in col. 1, line 66, that "Further, the subsea environment in which the fairings must operate renders likely the rapid failure of the rotational elements". Thus rotatable fairings are considered as unreliable in the prior art.

U.S. Pat. No. 6,401,646 describes a "snap-on" fairing.

U.S. Pat. No. 6,415,730 shows a fairing having several depressions in the surface for reducing the water's friction with the fairing surface, thus for reducing the drag in water.

SHORT SUMMARY OF THE INVENTION

A solution for significantly reducing the abovementioned problems is provided by the invention as given in the attached claim 1, being a rotatable fairing for a marine riser or other slender marine structure, said fairing for reducing watercurrent-induced stresses on said riser, said fairing having a tail portion for trailing generally in the downstream direction behind said riser. The novel and advantageous feature is that said fairing is provided by an attenuation unit for counteracting the unstable rotation of said fairing relative to said riser, in order to prevent undesired vibrations of said riser.

Further advantageous features are provided in the attached dependent claims.

SHORT FIGURE CAPTIONS

The invention is illustrated in the attached drawings, which are meant to be illustrative and shall not be construed in a limiting manner for the invention, which shall be limited by the attached claims only.

FIG. 1 is an illustration of an embodiment of the present invention, having an energy dissipation unit arranged between a rotating fairing and a riser.

FIG. 2 illustrates the problem of vortex induced vibrations of a riser in a current due to vortex shedding. The axis of the riser will be forced to follow a figure-eight path or an even more complex motion pattern. The amplitude of the cross-flow oscillations will be about the size of the diameter of the riser. The in-line oscillations may be about a quarter of the diameter of the riser.

Figure 5:
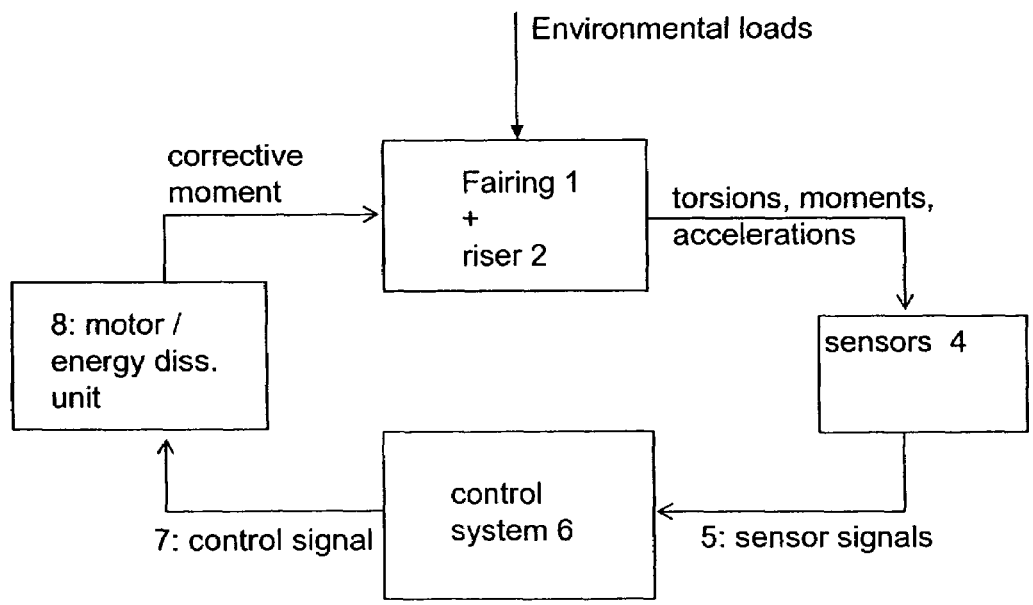

FIG. 5 outlines a control system for the fairing and riser, providing sensor signals to a control system arranged for calculating control signals for adjusting the dissipation rate of the attenuation unit or for commanding the attenuation unit to act as a motor for corrective movements of the fairing acting on the riser.

DESCRIPTION OF A PREFERRED EMBODIMENT OF THE INVENTION

The present invention is a rotatable fairing (1) for a marine riser or other slender marine structure (2), said structure extending between two fixed points, said riser or slender marine structure (2) being subject to a water current, said fairing (1) for reducing water current induced stresses on said riser (2). In the present case a floating platform is considered to be a fixed point for the riser, even though the platform will generally have some heave movement. Risers, particularly drilling risers, will typically have a heave compensated suspension at the upper end. The fairing comprises a long or short tail portion (3) for being oriented passively or actively to trail generally in the downstream direction behind said riser (2). The novel feature of the invention being that said fairing (1) is provided with an attenuation unit (8) for counteracting unstable rotation of the fairing (2) relative to the riser (2), in order to prevent undesirable vibrations of the riser (2).

The attenuation unit (8) may in a simple embodiment of the invention be an energy dissipating unit having properties similar to those of a dashpot damper, arranged for attenuating relative rotation between the riser (2) and the fairing (1), thus converting rotational energy into heat. In an alternative embodiment of the invention, the attenuation unit (8) may be arranged to passively convert rotational energy arising due to rotation between the riser (2) and the fairing (1) into accumulated pressure, electrical energy, etc., for counteracting the rotation of said fairing (2) relative to said riser (2). Further details of the energy dissipating unit/attenuation unit (8) is given below.

We define a marine riser or other slender marine structure (2) as comprising one or more of the following: A riser (2) between a wellhead on the seafloor and a vessel or platform near the surface, such as a drilling riser, usually being arranged generally vertically, a more or less vertically arranged production riser, a riser bundle comprising several risers.

The slender marine structure (2) may alternatively comprise an umbilical cable or line, an electrical power cable, a mooring line or the similar, all subject to water currents.

In a preferred embodiment of the present invention, the external shape of the fairing (1), resembles the fairing according to the expired US-patent U.S. Pat. No. 4,398,487, please see FIG. 1. The fairing (1) is provided with lower and upper bearing clamp sleeves (10) or rings (10L, 10U). The lower and upper bearing clamps may comprise pairs of semicylindrical parts arranged for clamping around a vertical cylindrical element (2) such as a buoyancy element module (2b) on a marine drilling riser (2), or directly around the diameter of the drilling riser (2). The clamps (10L, 10U) may be provided with passages for kill and choke lines and cables according to actual needs, the passages running through and within the circumference of lower and upper bearings (11L, 11U) being connected to the corresponding clamp sleeves or rings (10L, 10U), and within a circumference of a gear rim (12) around the riser, please see below.

The rotatable fairing comprises a heading or nose portion (31) having a vertically arranged central bore for the generally cylindrical riser (2), the bore possibly also arranged for enveloping a riser buoyancy element (2b). The semicylindrical surface of the heading portion (31) has an even transition symmetrically on either lateral surface of the riser's axis to form a tail portion (3) arranged for turning generally along the direction of water current flow. Tail fins (33) may be arranged at the trailing end of the tail portion (3) to improve the fairing's ability to align with the current flow.

Figure 1:
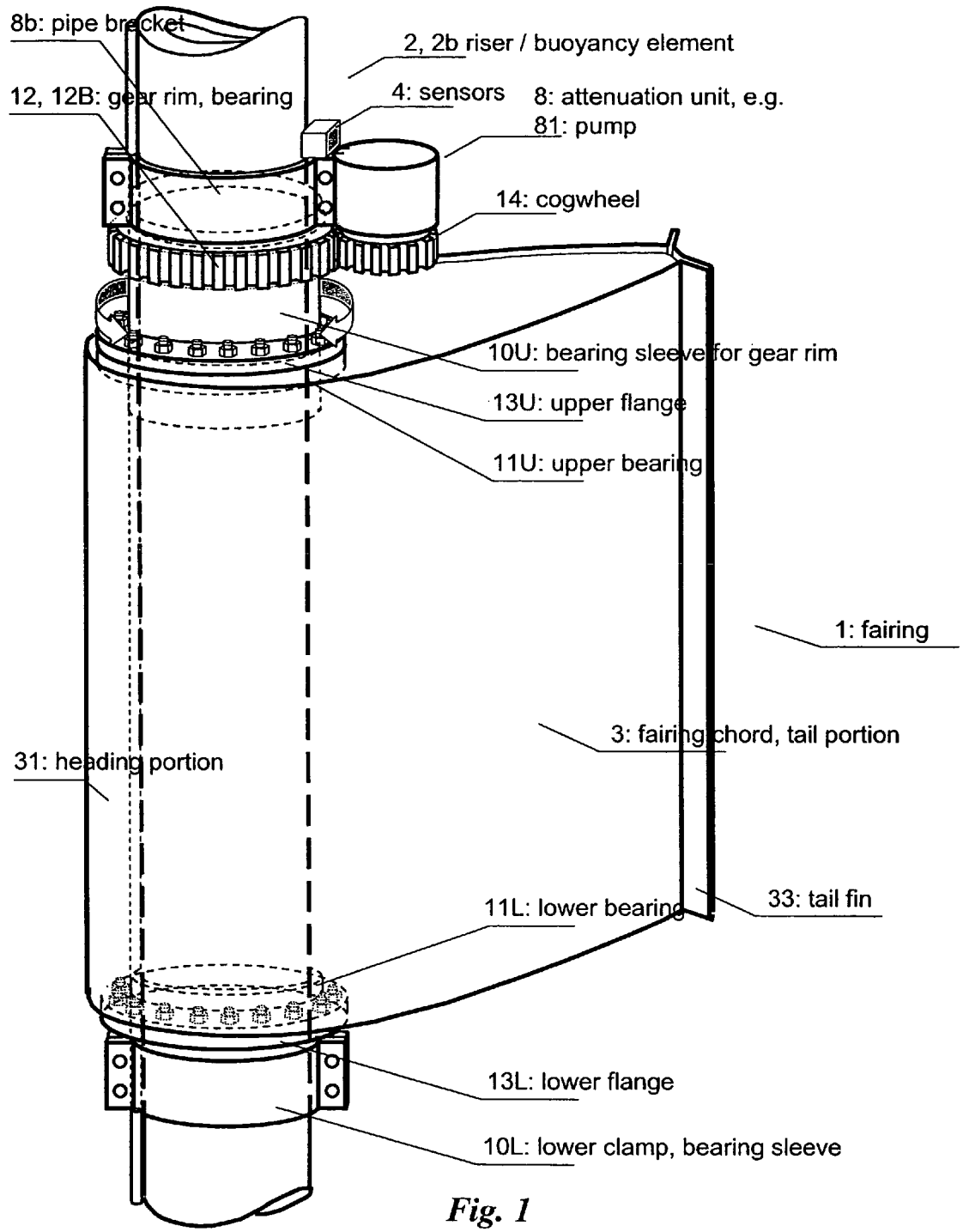
Figure 2:
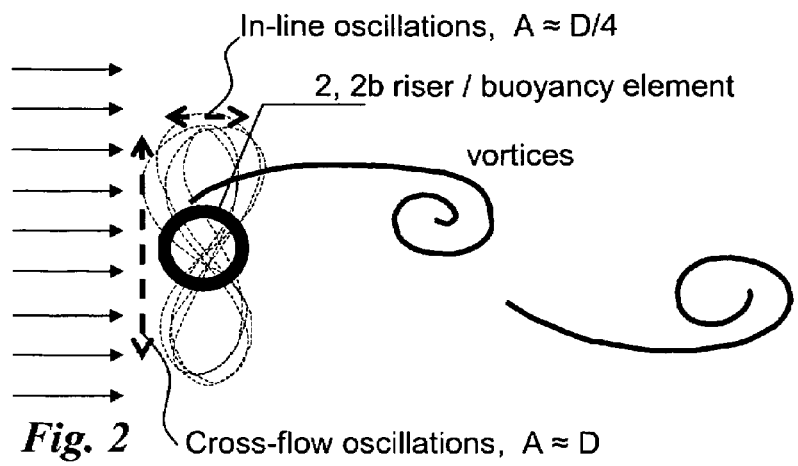

In a preferred embodiment of the invention, the fairing (1) is connected via lower and upper ring flanges (13L, 13U) and via corresponding lower and upper bearings (11L, 11U)

to the lower and upper riser clamps (10, 10U, 10L) for attachment about the periphery of the riser (2) or a buoyancy element (2b) of the riser (2). One or more of the clamps (10), here the upper clamp (10U) is arranged in a fixed, non-rotatable position relative to the riser pipe (2) and provided with a rotatable gear rim (12) for engagement with a cogwheel (14) of the energy dissipating unit/attenuating unit (8). The gear rim according to the embodiment of FIG. 1 is arranged for rotating on a gear rim bearing sleeve (12B) which may form a rotatable part on a bearing around the upper riser clamp (10U), and the energy dissipation/attenuation unit (8) is fixed to the upper clamp (10U). When the fairing (1) is forced to change its angular position relative to a fixed point on the riser wall, the gear rim (12) will follow the fairing and will rotate the cogwheel (14) of the energy dissipation/attenuation unit (8) and thus transfer part of the energy of the rotational movement of the fairing (1) to the energy dissipation/attenuation unit (8). In an alternative embodiment of the invention, the rim bearing (12) may conversely be fixed relative to the riser clamp (10), and the energy dissipation/attenuation unit (8) may accordingly be attached to the fairing (1).

The cogwheel (14) of the energy dissipating unit (8) may according to a preferred embodiment of the invention be disconnectably arranged from the gear rim (12) for preventing locking of said fairing (1) in a disadvantageous angular position in case of malfunction of the unit (8) or one of its components. The unit (8) may be provided with one or more of sensors (4) providing signals to a control unit (6) illustrated in FIG. 1. Advantageously, the attenuation unit (8) is arranged axially separate from the fairing so as for being serviceable from a ROV unit without having to dismantle the entire fairing (1) in case of malfunction of an energy dissipation unit (8). Similarly, each fairing should be exchangeable and arranged for being replaced by a spare fairing, and by conducting the exchange operation using a remotely operated vessel ROV.

Alternatives to the gear rim and cogwheel force transfer mechanism may be endless chains, belts and/or wheels arranged for rotational energy transfer between the riser and the energy dissipation unit.

Figure 4:
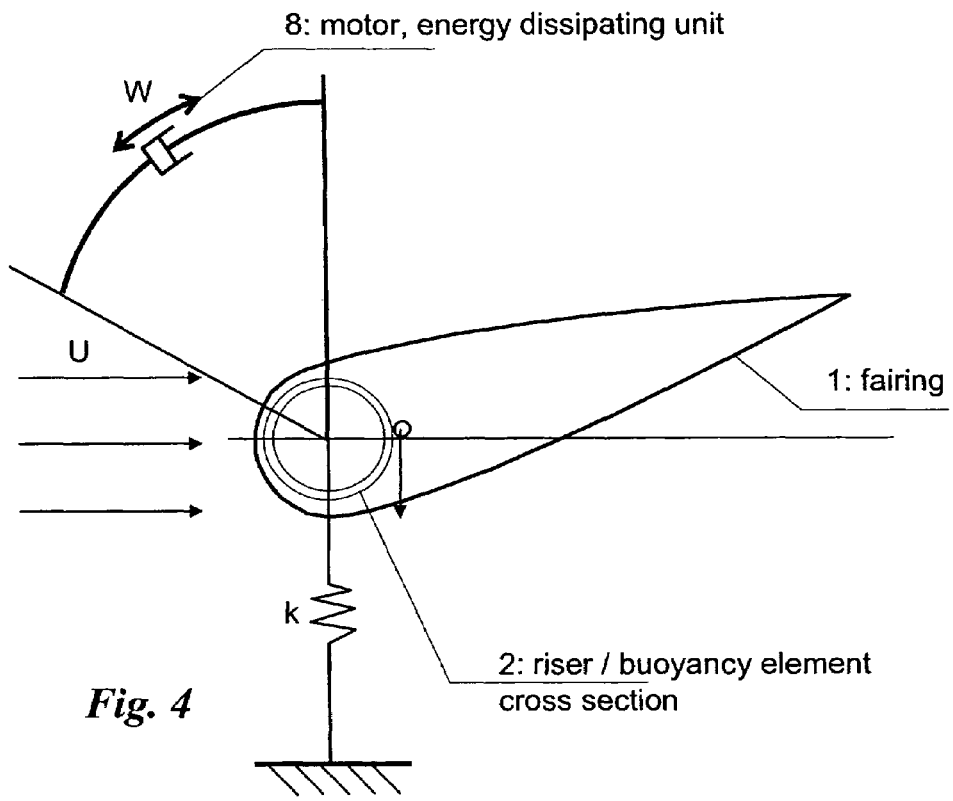
FIG. 4 illustrates an embodiment of the invention in which the energy dissipating unit also being arranged for intermittently acting as a motor for turning the fairing for actively attenuating lateral movements of the riser.

A passive energy dissipating fairing without any control system has an advantage of being less vulnerable to malfunction than an active fairing with a control system. However, an active system may be arranged with a sensor system and a control system for actively preventing vortex-induced vibrations. In order for the fairing to be used not only as a passive unit but also as an active unit, it may be advantageous to actively provide energy during short periods of time to the energy dissipating unit or motor (8). As mentioned above, in an alternative embodiment of the invention, the attenuation unit (8) may be arranged for converting rotational energy arising due to rotation between the riser (2) and the fairing (1) into accumulated pressure, electrical energy, etc., for counteracting the rotation of said fairing (2) relative to said riser (2). The energy dissipating unit (8) may e.g. comprise an electrical generator (85) for converting rotational energy due to differential angular rotation between the riser (2) and the fairing (1). For short periods of time, the energy transfer direction may be arranged in an opposite manner, the unit (8) acting for the short period as a motor using accumulated energy for rotating the cogwheel (14) for running along the gear rim (12) to change the orientation of the fairing (1) relative to the riser pipe (2) and the water current in order to create a desired laterally directed lift for the riser pipe (2), or otherwise affect the dynamic motion of the riser. The overall effect of the fairing would still be attenuation of the vibrations of the riser by an overall energy dissipation. Such active use of the energy dissipating unit or motor (8) may be used to counteract a periodic motion that may be predictable in the short term, in order to attenuate the amplitude of the motion, as illustrated in FIG. 4.

The dynamic translational and rotational motions of the un-attenuated fairings with no external forces and moments can be used to study the stability of the dynamic system and may be represented by the following equations, see OTC 16342 page 4:

$$m\ddot{y} - \frac{1}{2}\rho U^2 cS \frac{dC_L}{d\alpha}\theta + k(y + s\theta) = 0, \quad (1)$$

$$I\ddot{\theta} - \frac{1}{2}\rho U^2 cS \frac{dC_L}{d\alpha}(s-a)\theta + sk(y + s\theta) = 0 \quad (2)$$

in which $$y = A_y e^{i\omega t} \quad \ddot{y} = \lambda^2 A_y e^{i\omega t}$$

$$\theta = A_\theta e^{i\omega t} \quad \ddot{\theta} = \lambda^2 A_\theta e^{i\omega t}$$

Figure 3A:
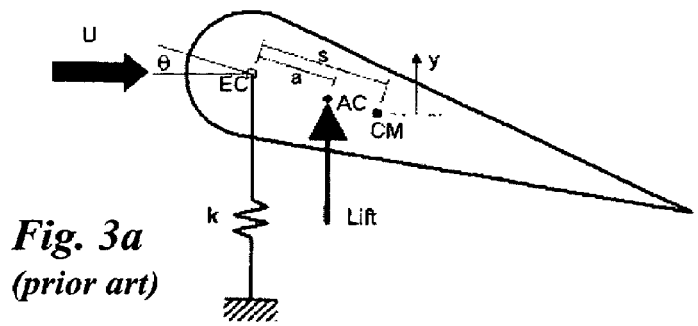
FIG. 3a illustrates a generally horizontal cross-section model of a fairing of the background art represented by the OTC 16342, the fairing arranged for rotating about a pipe centre, provided with a cross-flow direction spring to represent the pipe spring stiffness.
Figure 3B:
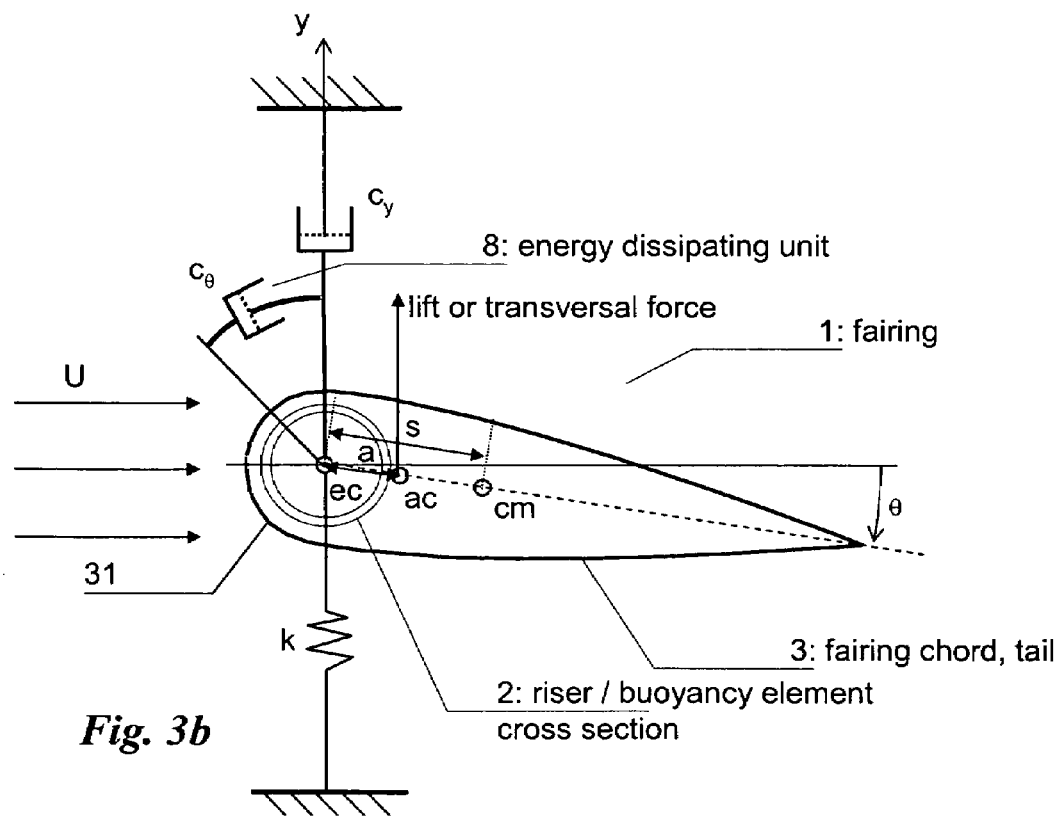
FIG. 3b illustrates a model of a fairing according to the invention, arranged for rotating about a pipe centre, having a rotational energy dissipating unit, further provided with a cross-flow direction energy dissipating unit to represent the pipe and hydrodynamic cross-flow forces. The rotational and translational energy dissipating units of the model may be modelled as dashpot attenuators.

In these equations, ref. FIG. 3b, c is the fairing length, $dC_L/d\alpha$ is the slope of the lift coefficient for a zero angle of attack, D is the nose diameter of the fairing, l is the moment of inertia of the fairing about its centre of mass, k is the transverse spring stiffness, m is the mass of a riser and fairing segment with entrained water and "added mass", s is the distance from the centre of pipe to the fairing centre of mass, S is the spanwise length of a fairing segment, t is time, U is the water velocity, $U_f$ is the flutter speed, $A_y$ is the lateral or "cross-flow" displacement amplitude of the centre of the riser and rotational centre or pivot point "ec" of the fairing, y is the transverse displacement of the riser centre θ is the angular deviation from the centre position of the fairing chord relative to the current direction, ρ is the fluid mass density, $A_\theta$ is the corresponding amplitude of the angular oscillation, z is the position along the riser length, α is the angle of attack, ω is the oscillation frequency, "ac" is the hydrodynamic or so-called aerodynamic centre, and "cm" is the centre of mass of the fairing, and λ is the period of the movement. Further, The $\ddot{y}$ and $\ddot{\theta}$ are the corresponding lateral acceleration and the angular acceleration.

The above equations (1) and (2) may be written on matrix form:

$$\begin{bmatrix} m & 0 \\ 0 & I \end{bmatrix} \begin{bmatrix} \ddot{y} \\ \ddot{\theta} \end{bmatrix} + \begin{bmatrix} k & sk - \frac{1}{2}\rho U^2 cS \frac{dC_L}{d\alpha} \\ sk & s^2 k - \frac{1}{2}\rho U^2 cS \frac{dC_L}{d\alpha}(s-a) \end{bmatrix} \begin{bmatrix} y \\ \theta \end{bmatrix} = 0 \quad (3), (4)$$

-continued $$\begin{bmatrix} m\lambda^2 + sk & sk - \frac{1}{2}\rho U^2 cs \frac{dC_L}{d\alpha} \\ sk & I\lambda^2 + s^2k - \frac{1}{2}\rho U^2 cs \frac{dC_L}{d\alpha}(s-a) \end{bmatrix} \begin{bmatrix} A_y \\ A_\theta \end{bmatrix} e^{\lambda t} = 0$$

$$y = A_y e^{i\omega t} = A_y(\cos(\omega t) + i\sin(\omega t))$$

$$\theta = A_\theta e^{i\omega t} = A_\theta(\cos(\omega t) + i\sin(\omega t))\lambda = i\omega, \quad \lambda^2 = -\omega^2$$

$$\begin{bmatrix} -m\omega^2 + k & sk\frac{1}{2}\rho U^2 cs \frac{dC_L}{d\alpha} \\ sk & -I\omega^2 + s^2k - \frac{1}{2}\rho U^2 cs \frac{dC_L}{d\alpha}(s-a) \end{bmatrix} \begin{bmatrix} A_y \\ A_\theta \end{bmatrix} e^{i\omega t} = 0$$

The above equations (1) and (2) do not comprise attenuation terms as functions of the lateral and angular velocities, i.e. first time derivatives $\dot{y}$ and $\dot{\theta}$.

A Fairing with Attenuation:

The present invention utilises the fact that transverse velocity and rotational speed attenuation terms comprising first time derivatives $\dot{y}$ and $\dot{\theta}$ should be considered, as in equations (5) and (6) below.

$$\begin{bmatrix} m & 0 \\ 0 & I \end{bmatrix} \begin{bmatrix} \ddot{y} \\ \ddot{\theta} \end{bmatrix} + \begin{bmatrix} C_y, C_y s + \frac{C_\theta}{s} \\ C_y s, C_y s^2 + C_\theta \end{bmatrix} \quad (5)(6)$$

$$\begin{bmatrix} \dot{y} \\ \dot{\theta} \end{bmatrix} + \begin{bmatrix} k, & sk - \frac{1}{2}\rho U^2 cS \frac{dC_L}{d\alpha} \\ sk, & s^2k - \frac{1}{2}\rho U^2 cS \frac{dC_L}{d\alpha}(s-a) \end{bmatrix} \begin{bmatrix} y \\ \theta \end{bmatrix} = 0$$

The terms $C_y$ and k depend on the bending stiffness of the riser pipe and hydrodynamic characteristics of the fairing. The term $C_\theta$ depends on the rotational energy dissipation, i.e. on the attenuation unit (8) according to the invention, see the model in FIG. 3b.

The linear homogeneous equations (3) (4) and (5) (6) given in matrix form have non-trivial solutions only if the matrix determinant is zero. Setting it to zero gives the characteristic equation in ω, which in this case is a quadratic in $\omega^2$. Analysis of the roots of the characteristic equation then leads to a stability criterion which indicates whether unstable motion can occur.

The energy dissipating unit (8) may preferably comprise a pump (81). One advantage of using a pump is the fact that the energy dissipation is not constant but increases as a function of the rotational speed $\dot{\theta}$. The dissipation unit-resistance should be a function of the angular speed $\dot{\theta}$. The angular speed $\dot{\theta}$ multiplied by a force moment equals the dissipated power.

In an alternative embodiment of the invention, said energy dissipating unit (8) may comprise a mechanical brake (83). However a mechanical brake may have the disadvantage that the brake force would depend to a small degree on the angular rate $\dot{\theta}$ of the fairing, and the brake force might have to overcome an initial brake force in order for movement to begin, thus the fairing might not be rotatable for relatively small current velocities or for initial vortex induced vibrations of the riser pipe, thus a mechanical brake on the fairing could incur unnecessary large drag forces due to fairings being non-aligned with the water-current. Additionally, there is a risk that a brake device may either get stuck and thus incur undesirable forces to the riser in the current, or alternatively may loose its brake effect and be left freely rotatable, which is not useful.

In an alternative embodiment of the invention, the attenuation unit (8) may further comprise a rotational spring (91) arranged between said fairing (1) and said attenuation unit (8) in order to take up intermittent rotational movements of the fairing.

Referring now to FIG. 5, the fairing (1) may be provided with one or more sensors (4) arranged for measuring forces, moments, and/or accelerations induced by watercurrents on said riser (2). For active control of the fairing, a control unit (6) is arranged for receiving sensor signals (5) from said one or more sensors (4) indicating said measured forces, moments, and/or accelerations on said riser (2). The control unit (6) is arranged for calculating a control signal (7) indicating the desired corrective torque to act on said fairing (2) in order to reduce said forces, moments, and/or accelerations to which said riser (2) is subject. The sensors (4) may comprise bending moment sensors (42) for being arranged on said marine riser (2), said bending moment sensors (42) arranged for measuring local bending strain due to bending moments (M) between successive portions ($2_i$, $2_{i+1}$) of said riser (2).

The fairing may comprise axial riser stress sensors (44) for being arranged on said marine riser (2), e.g. by combining three or four axially directed strain sensors arranged around the periphery of the riser. The fairing may comprise angular rate sensors (48) arranged for sensing an angular rate of said fairing (1) or said riser (2).

Thus the invention comprises an active method for reducing watercurrent-induced stresses on a marine riser (2) with a rotatable fairing (1) having a tail portion (3) for trailing generally in the downstream direction behind said riser (2). The method comprises a continuous loop of the following steps are conducted:

a) measuring forces and/or accelerations induced by watercurrents on said riser (2) using one or more sensors (4) arranged on said fairing (1);

b) providing sensor signals (5) from said one or more sensors (4) indicating said measured forces and/or accelerations on said riser (2) to a controller (6) arranged with said fairing (1);

c) calculating in said controller (6) a control signal (7) represented by a desired change (v) of rotational angle said fairing (1) relative to said riser (2) in order for reducing said forces and/or accelerations on said riser (2);

d) actuating said desired change (v) of rotational angle on said fairing (2) relative to said riser (2) upon receipt of said control signal (7) using a motor (8).

According to a preferred embodiment of the invention, the fairing's pump (81) has a pump energy dissipation rate ($p_P$) being a product of a pump constant ($p_c$) and a function increasing with an increasing angular rate ($\dot{\theta}$) of said fairing (2) relative to the riser (2). The pump energy dissipation rate's pump constant ($p_c$) may have a predefined value given before assembly and launch of said riser (2).

The fairing (1) may further be provided with a control system (6) arranged for receiving sensor signals (5) from said one or more sensors (4) indicating said measured forces and/or accelerations on said riser (2), said pump energy dissipation rate's pump constant ($p_c$) having a variable value controlled by a control signal (7) calculated by said control system (6) during operation.

The invention claimed is:

1. A rotatable fairing for a marine riser or other slender marine structure, said fairing for reducing watercurrent-induced stresses on said riser, said fairing having a tail portion for trailing generally in the downstream direction behind said riser, wherein said fairing is provided with an attenuation unit for counteracting the unstable rotation of said fairing relative to said riser, in order to prevent undesired vibrations of said riser, said attenuation unit having an energy dissipation rate which increases as a function of the fairing's angular speed.

2. The fairing of claim 1, said fairing provided a nose portion between which said nose portion and said tail portion a bore for said riser is accommodated, said nose portion arranged for generally heading upstream relative to said riser.

3. The fairing of claim 1, said fairing provided with one or more clamps for attachment to and around a periphery of said riser, said clamps arranged with a gear rim for engagement with an actuating cogged wheel of said attenuation unit.

4. The fairing of claim 3, said cogged wheel of said attenuation unit arranged for being disconnectable from said gear rim for preventing locking of said fairing in a disadvantageous angular position.

5. The fairing of claim 3 said attenuation unit comprising a rotational spring connected between the fairing and the gear rim.

6. The fairing of claim 1, said attenuation unit comprising a dashpot.

7. The fairing of claim 1, said attenuation unit comprising a mechanical brake.

8. The fairing of claim 1, said attenuation unit comprising a generator.

9. The fairing of claim 1, said attenuation unit comprising a motor.

10. The fairing of claim 1, said fairing provided with one or more force sensors arranged for measuring forces induced by watercurrents on said riser.

11. The fairing of claim 10, said fairing provided with a control unit for receiving force sensor signals from said one or more sensors indicating said measured forces on said riser, said control unit arranged for calculating a control signal indicating the desired corrective moment to act on said fairing in order to reduce said forces.

12. The fairing of claim 11,
said attenuation unit comprising a pump;
said pump having a pump energy dissipation rate being a product of a pump constant and a function increasing with an increasing angular rate ($\theta$) of said fairing relative to said riser; and
said pump energy dissipation rate's pump constant having a variable value controlled by a control signal calculated by said control unit during operation.

13. The fairing according to claim 10, said force sensors comprising axial stress sensors for being arranged on said marine riser by combining three or four axially directed strain sensors.

14. The fairing according to claim 10, said fairing further provided with angular rate sensors arranged for sensing an angular rate of said fairing or said riser.

15. The fairing of claim 1, said fairing provided with one or more moment sensors arranged for measuring moments induced by watercurrents on said riser.

16. The fairing of claim 15, said fairing provided with a control unit for receiving moment sensor signals from said one or more moment sensors indicating said measured moments on said riser, said control unit arranged for calculating a control signal indicating a desired corrective moment to act on said fairing in order to reduce said moments on said riser.

17. The fairing according to claim 16, said moment sensors being bending moment sensors for being arranged on said marine riser, said bending moment sensors arranged for measuring local bending strain due to bending moments between successive portions of said riser.

18. The fairing of claim 16,
said attenuation unit comprising a pump;
said pump having a pump energy dissipation rate being a product of a pump constant and a function increasing with an increasing angular rate ($\theta$) of said fairing relative to said riser; and
said pump energy dissipation rate's pump constant having a variable value controlled by a control signal calculated by said control unit during operation.

19. The fairing of claim 1, said fairing provided with one or more acceleration sensors arranged for measuring accelerations induced by watercurrents on said riser.

20. The fairing of claim 19, said fairing provided with a control unit for receiving acceleration sensor signals from said one or more acceleration sensors indicating said measured accelerations on said riser, said control unit arranged for calculating a control signal indicating a desired corrective moment to act on said fairing in order to reduce said accelerations on said riser.

21. The fairing of claim 20,
said attenuation unit comprising a pump;
said pump having a pump energy dissipation rate being a product of a pump constant and a function increasing with an increasing angular rate ($\theta$) of said fairing relative to said riser; and
said pump energy dissipation rate's pump constant having a variable value controlled by a control signal calculated by said control unit during operation.

22. The fairing of claim 1, said attention unit comprising a pump.

23. The fairing of claim 22, said pump having a pump energy dissipation rate being a product of a pump constant and a function increasing with an increasing angular rate ($\theta$) of said fairing relative to said riser.

24. The fairing of claim 23, said pump energy dissipation rate's pump constant having a predefined value given before assembly and launch of said riser.

25. A method for reducing watercurrent-induced stresses on a marine riser with a rotatable fairing having a tail portion for trailing generally in the downstream direction behind said riser, the method comprising a continuous loop of the following steps:
a) measuring forces induced by watercurrents on said riser using one or more force sensors arranged on said fairing;
b) providing sensor signals from said one or more force sensors indicating said measured forces on said riser to a control unit arranged with said fairing;
c) calculating in said control unit a control signal representing a change of rotational angle of said fairing relative to said riser in order for reducing said forces on said riser; and
d) actuating said desired change of rotational angle of said fairing relative to said riser upon receipt of said control signal using a motor.

26. A method for reducing watercurrent-induced stresses on a marine riser with a rotatable fairing having a tail portion for trailing generally in the downstream direction behind said riser, the method comprising a continuous loop of the following steps:
- a) measuring accelerations induced by watercurrents on said riser using one or more acceleration sensors arranged on said fairing;
- b) providing sensor signals from said one or more acceleration sensors indicating said measured accelerations of said riser to a control unit arranged with said fairing;
- c) calculating in said control unit a control signal representing a change of rotational angle of said fairing relative to said riser in order for reducing said accelerations of said riser; and
- d) actuating said desired change of rotational angle of said fairing relative to said riser upon receipt of said control signal using a motor.

* * * * *